July 3, 1962

L. E. STAHL 3,042,446

HEADLINER PANEL AND ROOF ASSEMBLY

Filed Sept. 28, 1959

INVENTOR.
LLOYD E. STAHL
BY
Burton & Parker
ATTORNEYS

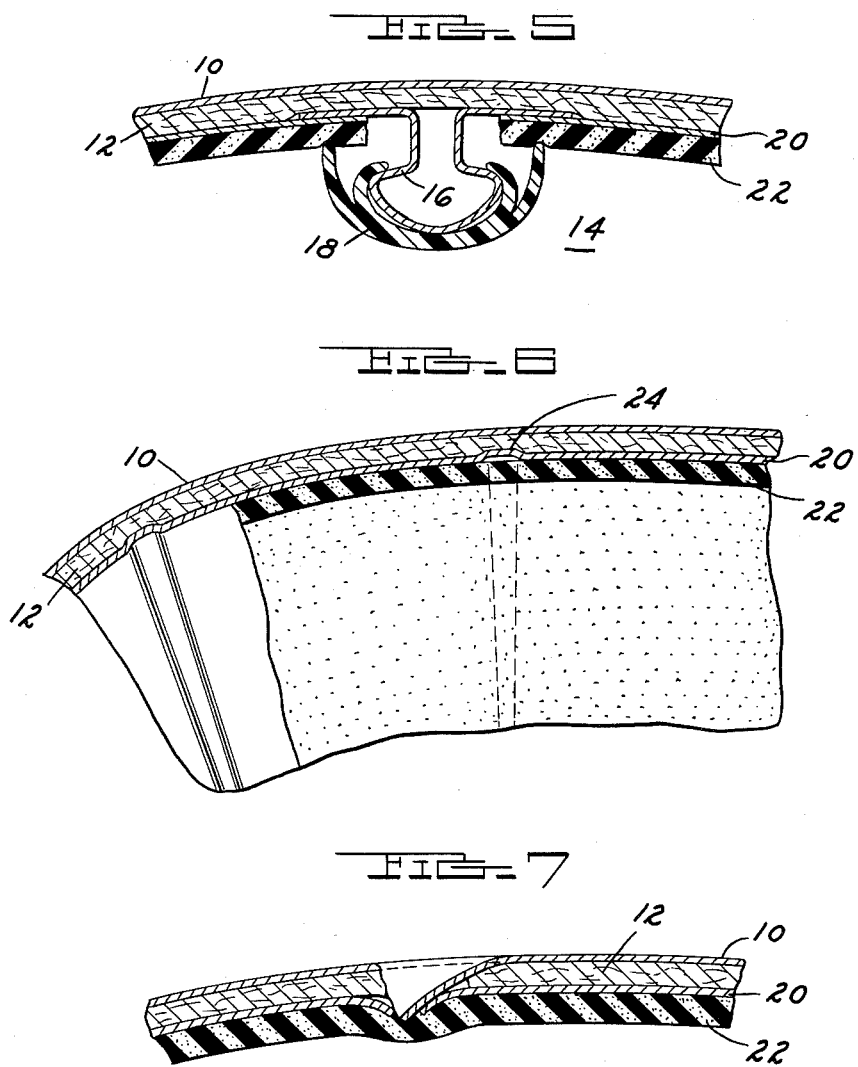

United States Patent Office 3,042,446
Patented July 3, 1962

3,042,446
HEADLINER PANEL AND ROOF ASSEMBLY
Lloyd E. Stahl, Monroe, Mich., assignor to Woodall Industries, Incorporated, Detroit, Mich., a corporation of Michigan
Filed Sept. 28, 1959, Ser. No. 842,737
4 Claims. (Cl. 296—137)

This invention relates to an improved laminated headliner panel for a vehicle body or the like and to an improved laminated roof assembly including such headliner panel and also including a metal roof panel.

An object is to provide a laminated headliner panel which presents a neat, attractive appearance, which is of a rugged, self-supporting character, and which exhibits to view within the interior of the body a spongy, cushiony finish lamination.

Another object is the provision of a laminated headliner panel of the character described wherein the cushiony finish lamination, which is relatively non-self-supporting, but is tough, spongy, and elastic, and may be formed of sponge rubber, has a relatively rigid self-supporting foundation lamination of composition fiberboard, such as Masonite or the like, associated therewith to give structure and shape and support thereto. Due to the exigencies of trimming the interior of a vehicle body roof, and attaching fittings such as visor support brackets trough the headliner to the roof, it is frequently necessary to bend or bead the foundation lamination to make the same conform to the roof contour. Such bending of the foundation lamination to produce conformation with the underside of the metal roof, particularly if angular conformation, wherein the headliner is drawn up along a line of bend snugly against the roof is required, may result in rippling, breakage, or rupture of the foundation lamination along the line of bend. With my improved laminated headliner this bending or breakage or fracture of the foundation lamination may result without such deformation or breakage showing through or being visible upon the exposed surface of the sponge rubber lamination within the interior of the body.

A meritorious feature is that the spongy finish layer is sufficiently elastic, either stretchable or compressible, to yield and permit the desired deformation or bending or even fracture of the foundation lamination to enable it to conform to the contour of the roof while holding the foundation lamination together along the line of bend and presenting a smooth, continuous finished surface contour over such underlying deformation or breakage of the foundation lamination.

A further object is the provision of a headliner of the character just described wherein the spongy, elastic finish lamination serves as a protective crash-proof layer within the interior of the body in that, if the foundation lamination to which the spongy layer is attached or the underlying metal roof panel is bent, fractured, or ruptured as a result of accident or the like, such bending, fracturing, or ruptiuring does not, unless of a substantial extent, tear through the cushion finish layer. Such cushion finish layer yields and provides a cushion layer over the bent or fractured edge of the underlying foundation lamination or metal roof panel.

In the application of headliner panels to the underside of the meal roof of an automobile body, such panels are held in place by panel-matching and supporting strips as shown in my U.S. Patent No. 2,823,951, dated February 18, 1958. A laminated headliner panel of the character herein described, when held in place by such headliner matching and supporting strips, possesses the advantage of permitting relative displacement of the strips and panels during travel of the vehicle over the road without such displacement resulting in undesirable squeaks. The elastic, spongy finish lamination is of sufficient thickness and elasticity so that it yields sufficiently to permit the necessary relative displacement of the strip and panel without resulting noise or squeak as might otherwise occur upon movement of the strip over the surface of a panel board.

Another object of my laminated headliner panel is that, due to the presence of the elastic, cushiony finish lamination, the retaining strips will always engage the panels throughout the entire length of the strips so as to hold the panels against the roof notwithstanding manufacturing variations in dimension of the strips and panels. Any variations in dimension of the strips and panels which might result in a strip being held forcibly at one point against the panel while being spaced slightly therefrom at another point will be taken up by the elasticity of the cushiony finish lamination and the strip will always grip the laminated headliner panel throughout the entire length of the strip.

The cushiony finish layer is moisture-resistant so that it is not deleteriously affected by moisture. If the foundation layer is of a composition fiberboard character which tends to absorb moisture (which is a common characteristic of such material), and which may expand and contract because of such moisture absorption or dehydration, the elastic cushiony layer will permit such expansion and contraction without buckling or otherwise deforming the foundation layer, and minor or moderate rippling of the foundation lamination will not show through the sponge rubber. The sponge cushion lamination provides sound and heat insulation value.

This application is a continuation-in-part of application Serial No. 670,913, now abandoned.

Other objects, advantages, and meritorious features will more fully appear from the following description, claims, and accompanying drawings, wherein:

FIG. 5 is a cross sectional view taken on the line 5—5 of FIG. 1;

FIG. 6 is a cross sectional view taken on the line 6—6 of FIG. 1; and

FIG. 7 is a cross sectional view through a portion of a roof structure including the metal roof panel and my laminated headliner panel and showing the roof panel fractured.

In my copending application hereinabove mentioned, I show a headliner for an automobile body wherein a plurality of panels are held upwardly against the underside of the roof by panel-matching and supporting strips. In certain of the figures, the panels extend transversely of the body. In other figures the panels extend in a fore and aft direction. The panels themselves are indicated as formed of composition fiberboard such as Masonite or other suitable sheet material which is self-supporting and relatively rigid but sufficiently flexible to permit of its being bent along large arcs to underlie the contour of the roof. Such panels if bent too sharply tend to break or fracture. In certain locations within the body a compound curvature must be given to the panels and in Patent No. 2,823,951, supra, such as shown in FIGS. 18, 19, and 20, and the panel is provided with beads to facilitate bending to such compound curvature.

Figure 1:
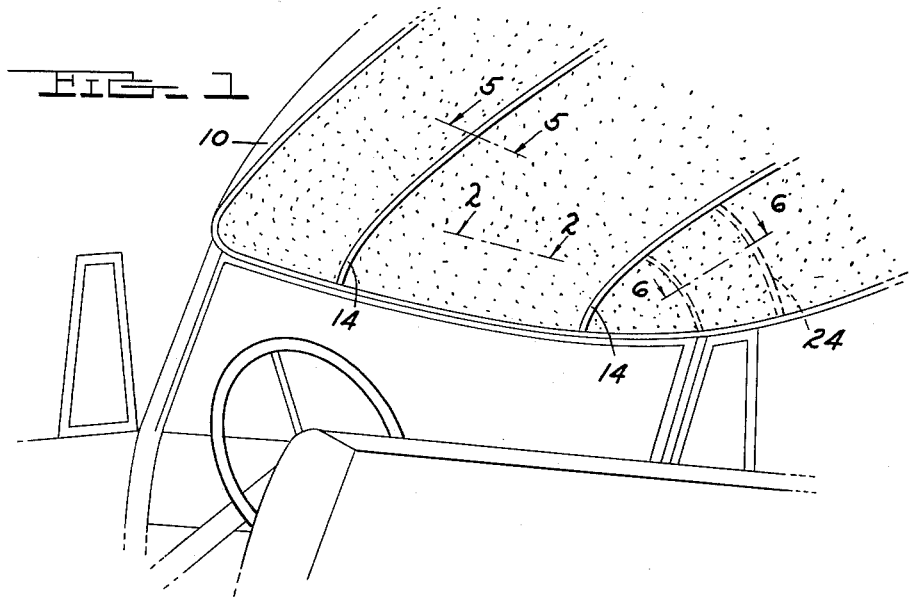
FIG. 1 is a fragmentary perspective of the ceiling portion at the front end of a vehicle body provided with headliner panels embodying the invention.
Figure 2:
FIG. 2 is a sectional view through a panel embodying the invention taken along a line such as 2—2 in FIG. 1.

In the drawings herein an automobile body provided with the usual metal roof panel 10 is illustrated in FIGS. 1, 5, and 6. FIGS. 5 and 6 show the usual mat of insulating material 12 secured to the underside of the roof panel 10. Underlying this roof panel with its insulation pad are the headliner panels of my invention. These headliner panels are held in place by panel-matching and supporting strips as shown in FIGS. 1 and 5 and as described in detail in my U.S. patent supra. Such panel-supporting strip in indicated in FIG. 1 as 14. It is shown in FIG. 5 as consisting of a resilient metal base section 16 and a resilient plastic cap section 18.

The metal base section is secured at its ends to suitable supporting parts of the automobile body as described in the copending applications. Such base section is flexible and resilient. The cap section 18 is adapted to be sprung as shown over the base section and it has complementary linear marginal portions which engage the panels and hold them upwardly toward the underside of the roof, all as described in the applications supra.

The headliner panel of this application comprises a foundation lamination 20 which may be formed of Masonite or other suitable composition fiberboard. Such foundation lamination is relatively stiff and self-supporting but it is sufficiently flexible so as to be bent to conform generally to the desired arcuate contour of the roof either fore and aft or transversely. It is sufficiently rigid to be self-supporting. It is, however, relatively inelastic and breakable whereby it is subject to rupture or fracture if deformed too sharply.

I secure to the underside of this foundation lamination 20 a lamination 22 of soft, cushiony, spongy sheet material. Such spongy sheet material may be a plastic sponge layer such as is available on the market. Polyvinyl sponge or foam, such as polyvinyl fluoride, foamed rubber, polyurethane foam, either polyester or polyether type or cellulose sponges may be used. This sponge layer is relatively elastic. It is stretchable or compressible as well as being freely flexible. It is of a soft, porous character. It is resistant to moisture in that it does not suffer deterioration under the presence of moisture. It presents an attractive appearance giving a soft upholstered effect. It is provided as shown in a thickness which is substantially greater than the thickness of the foundation layer 20. It constitutes, in effect, a crash-panel layer over the foundation layer. It is sufficiently elastic and spongy so that it is relatively non-fracturable and in case of an accident which might rupture the roof panel 10 and the foundation lamination 20, the cushion layer 22 would yield rather than permit the torn edge of the roof panel or foundation panel to cut therethrough as shown in FIG. 7.

Figure 3:
FIG. 3 is a cross sectional view through a panel embodying the invention showing both the foundation layer and the cushiony trim layer provided with bead-like deformations formed therein.
Figure 4:
FIG. 4 is a cross sectional view through a panel embodying the invention showing the foundation layer provided with bead-like deformations but showing the finish layer extending thereover without deformation.

As shown in FIGS. 3, 4, and 6, the foundation panel 20 may be provided with beads 24 which facilitate the bending of the foundation panel into a compound curvature such as may be necessary along the cove portions of the underside of the roof. For such panels it may be desirable to use a composition fiberboard more readily susceptible to beading than is Masonite and several such composition fiberboards are available. One suitable fiberboard is sold under the name of Mead board.

In FIG. 3 the laminated headliner panel, i.e., both laminations 20 and 22, are beaded as shown. In FIG. 4 the foundation lamination 20 alone is beaded and the cushiony lamination 22 extends as a bridge across the bead deformation. In either case the cushiony lamination is sufficiently elastic so that it accommodates itself readily to expansion or contraction of the foundation layer as a result of this beading. In the case of FIG. 4 it conceals the beading and presents a smooth surface contour within the automobile body. If the foundation panel is bent along a line other than a bead line or if the foundation panel is not beaded, the sponge layer functions to permit, to hide or to substantially conceal the bend in the same way as it does a bead bend.

The elasticity of the sponge layer 22 is such that contraction or expansion of the foundation lamination 20 due to absorption of moisture or dehydration is not so resisted by the layer 22 as to produce any undesirable buckling.

As shown in FIG. 5, the matching and supporting strips exert their pressure to hold the panels upwardly against the underside of the metal roof through the cushiony layer 22. Any variations in dimension of the laminations of the panel or of the strip are accommodated for by the fact that the layer 22 yields sufficiently so that the strip at all times exerts a grip upon the laminated headliner panel holding it upwardly.

Due to travel of the vehicle over the road as well as due to expansion and contraction under absorption of moisture, foundation panels 20 may shift slightly with respect to the strips. The sponge layer 22 prevents any such shifting from resulting in squeak or undesirable noise. The sponge layer also acts as a sound and/or heat insulator. The foundation layer may be provided with a plurality of perforations to increase the insulation value of the liner.

What I claim is:

1. A laminated headliner panel structure adapted to be held upwardly in position against the underside of an automobile body roof comprising, in combination: a laminated headliner panel comprising a self-supporting relatively rigid inelastic fracturable but somewhat flexible composition fiberboard foundation panel lamination subject to expansion and contraction under variations in absorption of moisture, and a cushiony relatively non-fracturable elastic sponge rubber-like finish lamination secured to and extending substantially completely over the underside of the composition fiberboard foundation lamination and adapted to resiliently expand and contract without visible rippling to permit expansion and contraction of the foundation lamination; and a resilient panel supporting strip associated with said body roof and tensioned upwardly toward the roof and having a panel margin receiving channel receiving the margin of the headliner panel including the margin of the foundation lamination and the margin of the sponge rubber-like finish lamination grippingly engaging both and embedding the edge of the channel within the sponge rubber-like finish lamination whereby said finish lamination accommodates within itself for relative movement of the panel foundation and strip.

2. A laminated headliner panel structure adapted to be held upwardly in position against the underside of an automobile body roof comprising, in combination: a laminated headliner panel comprising a self-supporting relatively rigid inelastic fracturable but somewhat flexible composition fiberboard foundation panel lamination, and a cushiony relatively non-fracturable elastic sponge rubber-like finish lamination secured to and extending substantially completely over the underside of the composition fiberboard lamination; and a resilient panel supporting strip associated with said body roof and tensioned upwardly toward the roof and having a panel margin receiving channel receiving the margin of the headliner panel including the margin of the foundation lamination and the margin of the sponge rubber-like finish lamination grippingly engaging both and embedding an edge of the channel within the sponge rubber-like finish lamination whereby said sponge rubber-like finish lamination accommodates within itself for relative movement of the panel foundation and strip.

3. A laminated headliner panel assembly structure adapted to be held upwardly against the underside of an automobile body roof comprising, in combination: a headliner panel comprising a self-supporting relatively rigid fracturable inelastic but somewhat flexible fibrous composition foundation lamination provided with a bead-like deformation therein extending thereacross and laterally offset from the plane of the foundation lamination, and a cushiony relatively non-fracturable and elastic sponge rubber-like finish lamination secured to the underside of the foundation lamination and extending over and bridging the depression of the bead-like deformation therein, said cushiony elastic sponge rubber-like finish lamination being yieldable without buckling or rupture to permit contraction and/or expansion of the foundation lamination along the line of the bead, said bead adapted to permit bending of the foundation lamination along a compound curvature; and a resilient panel supporting strip associated with said body roof and tensioned upwardly toward the roof and having a panel margin receiving channel receiving the margin of the headliner panel including the margin of the foundation lamination and the margin of the finish lamination grippingly engaging both and embedding an edge of the channel within the sponge rubber-like finish lamination whereby said sponge rubber-like finish lamination accommodates within itself for relative movement of the panel foundation and strip.

4. A headliner panel assembly structure as defined in claim 3 characterized in that the composition fiberboard foundation lamination is subject to contraction and/or expansion under variations of moisture absorption and the sponge rubber-like finish lamination is adapted to permit such expansion and/or contraction of the foundation lamination under variations of moisture absorption and adapted to permit expansion and/or contraction at opposite ends of the bead without rippling of the sponge rubber-like finish lamination.

References Cited in the file of this patent

UNITED STATES PATENTS

| | | |
|---|---|---|
| 1,905,895 | Bronson | Apr. 25, 1933 |
| 2,020,135 | Cavanagh | Nov. 5, 1935 |
| 2,139,882 | Cunnington | Dec. 13, 1938 |
| 2,207,958 | Tuell | July 16, 1940 |
| 2,674,488 | Lyijynen | Apr. 6, 1954 |
| 2,879,105 | Stahl | Mar. 24, 1959 |